United States Patent [19]

Logan et al.

[11] Patent Number: 4,519,559
[45] Date of Patent: May 28, 1985

[54] LANDING GEAR ENERGY DISTRIBUTION AND RIGHTING SYSTEM

[75] Inventors: Andrew H. Logan, Rancho Palos Verdes, Calif.; Robert A. Wagner, deceased, late of Redondo Beach, Calif., by Jeanne M. Roireau, executrix

[73] Assignee: Hughes Helicopters, Inc., Culver City, Calif.

[21] Appl. No.: 107,144

[22] Filed: Dec. 26, 1979

[51] Int. Cl.³ .............................................. B64C 25/58
[52] U.S. Cl. ......................... 244/17.17; 244/104 FP; 244/108
[58] Field of Search ............ 244/17.17, 100 R, 104 R, 244/104 FP, 108; 180/41; 280/6 H, 6.11; 267/DIG. 2

[56] References Cited

U.S. PATENT DOCUMENTS

| | | | |
|---|---|---|---|
| 1,668,122 | 5/1928 | Mummert et al. | 244/100 R |
| 1,811,152 | 6/1931 | Procofieff-Seversky | 244/100 R |
| 2,908,472 | 10/1959 | McDonald | 244/100 R |
| 2,933,270 | 4/1960 | Maltby | 244/17.17 |
| 3,038,685 | 6/1962 | Hofmann | 244/17.17 |
| 3,857,533 | 12/1974 | Mason | 244/100 R |
| 4,062,507 | 12/1977 | Felder | 244/104 FP |

*Primary Examiner*—Trygve M. Blix
*Assistant Examiner*—Rodney Corl

*Attorney, Agent, or Firm*—Beehler, Pavitt, Siegemund, Jagger & Martella

[57] ABSTRACT

Each landing gear of the undercarriage of an aircraft includes an hydraulic cylinder, and the hydraulic cylinders are interconnected through hydraulic restoring devices. The hydraulic restoring devices yieldably urge the pistons in each of the hydraulic cylinders to an equilibrium position, thereby restoring the length of each landing gear to an equilibrium length following a disturbance. In non-level landings, the hydraulically interconnected system causes the landing gear that strikes the ground first to be compressed and the other landing gears to be extended; this absorbs some of the energy of the impact. Extension of the other landing gears tends to limit the extent to which landing energy is converted to angular velocity of the aircraft caused by pivoting of the center of gravity of the aircraft about the first landing gear to contact the ground. Once all of the landing gears have contacted the ground, the restoring device acts to restore the aircraft to its normal equilibrium attitude with respect to the ground. In the event a non-level landing is aborted after one of the landing gears has struck the ground, the restoring device restores the landing gears to their normal in-flight configuration with respect to the airframe as the aircraft becomes airborne again in preparation for the next landing attempt.

13 Claims, 18 Drawing Figures

LANDING GEAR ENERGY DISTRIBUTION AND RIGHTING SYSTEM

BACKGROUND OF THE INVENTION

1. Field of the Invention

This invention is in the field of aircraft, and particularly relates to a landing gear system adapted to absorb and distribute the energy of a non-level landing and to restore the aircraft to its proper attitude with respect to the ground following such a landing.

2. The Prior Art

In U.S. Pat. No. 2,368,855 issued Feb. 6, 1945 to Levy, there is disclosed a two-stage hydraulic landing gear system. Each of the landing gears includes a relatively soft upper dashpot and a relatively stiff lower dashpot. As one of the wheels contacts the ground, hydraulic fluid is expressed from the upper dashpot into an accumulator and energy is absorbed in the process. The upper dashpots of each of the landing gears communicate so that if one of the wheels strikes the ground before the others do, the other landing gears will be extended by the transfer of fluid. Because the upper dashpots in each of the landing gears are relatively soft, as the full weight of the aircraft is applied, the upper dashpots reach the end of their stroke and are locked in this fully-compressed condition. Thereafter, during taxiing of the aircraft, only the relatively stiff lower dashpots are effective.

This system would appear to have problems in the event of a landing in which the aircraft rocks from one side to the other, as commonly occurs with helicopters. If the landing gear on one side of the aircraft were to become locked and the landing then aborted, the second landing attempt would be complicated by the unequal lengths of the landing gears.

In U.S. Pat. No. 3,327,974 issued June 27, 1967, Nicholl discloses a landing gear apparatus in which a reversable actuator transfers liquid from the piston of one landing gear to the piston of another landing gear. The load on each landing gear is sensed and the difference in the loads is calculated. The more highly-loaded gear is contracted to change the trim of the aircraft to reduce the difference in loads.

This system is relatively complex since it requires both sensing as well as the controlled application of power to transfer the liquid.

In U.S. Pat. No. 3,042,345 issued July 3, 1962 to Holland, Jr., there is disclosed in FIGS. 18–20 an interconnected hydraulic landing gear apparatus. Cylinders in each landing gear are connected so that if the aircraft hits on one of the landing gears first, compressing it, the other landing gears are extended. This would appear to cause the aircraft to tilt even more severely, and is not necessarily desirable. Further, there is no provision for restoring the aircraft to a proper attitude with respect to the ground. A similar system is shown in U.S. Pat. No. 2,519,522 issued Aug. 22, 1950 to Wells.

In U.S. Pat. No. 4,004,762 issued Jan. 25, 1977, Jenkins discloses an electrically operated system for maintaining the mean height of the aircraft above the ground.

Thus, although systems are known in the art to perform related functions, no system is known to perform the functions of the present invention or to possess its advantageously simple structure.

SUMMARY OF THE INVENTION

The system of the present invention absorbs the energy imparted to the landing gear which first strikes the ground and simultaneously stabilizes the aircraft attitude by extending the landing gears which have not yet touched the ground, and thereafter gently restores the aircraft to a desired equilibrium attitude with respect to the ground.

In the event one of the landing gears is compressed by an aborted touchdown landing, the system includes means for restoring the landing gears to their normal prelanding configuration.

In a preferred embodiment, each of the landing gears includes an hydraulic chamber whose volume varies with the applied load. These hydraulic chambers are hydraulically interconnected through a restoring device which yieldably urges hydraulic fluid back into a previously-compressed hydraulic chamber to restore the landing gear to an equilibrium position The novel features which are believed to be characteristic of the invention both as to organization and method of operation, will be better understood from the following description, considered in connection with the accompanying drawings in which a preferred embodiment of the invention is illustrated by way of example. It is to be expressly understood, however, that the drawings are for the purpose of illustration and description only, and are not intended as a definition of the limits of the invention.

DETAILED DESCRIPTION OF THE PREFERRED EMBODIMENT

Figure 1:
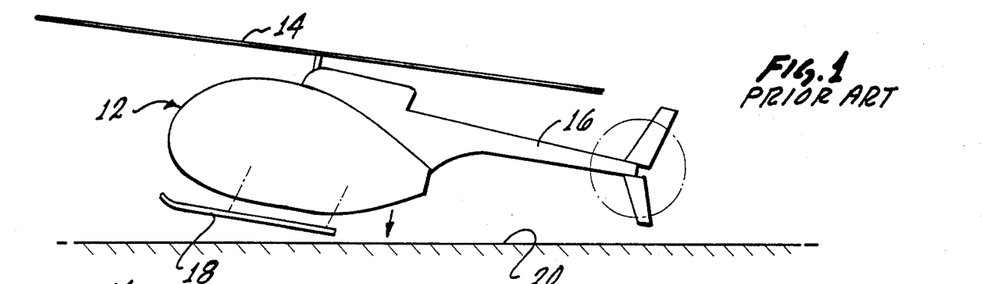
FIG. 1 is a diagram showing a helicopter landing in a nose-up attitude.
Figure 2:
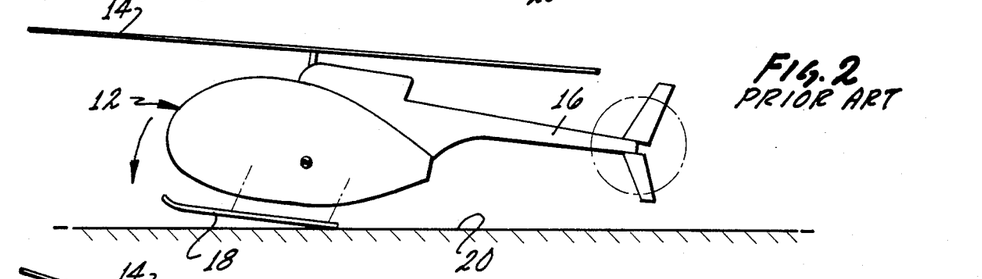
FIG. 2 is a diagram similar to FIG. 1 illustrating the development of a nose-down angular velocity as the aft portion of the skid strikes the ground.
Figure 3:
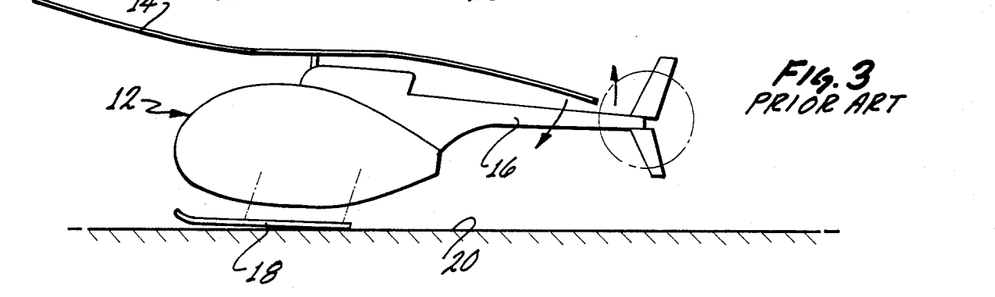
FIG. 3 is diagram similar to FIGS. 1 and 2 illustrating the manner in which rotor-tail boom interference is aggravated by the pilot's reaction to the nosedown angular velocity.

Turning now to the drawings, in which like parts are denoted by the same reference numeral throughout, there is shown in FIGS. 1, 2 and 3 a sequence of events which led to development of the present invention. The problem arises with excessive frequency during emergency autorotations, although it could occur in other non-level landings.

The sequence of events begins with the helicopter 12 of FIG. 1 approaching the ground 20 in an autorotation landing. Although ideally the pilot would maintain the helicopter in a level attitude, it frequently happens that the helicopter approaches the ground vertically as indicated by the arrow in FIG. 1 in a nose-up attitude. This causes the aft portion of the skid 18 to strike the ground 20 before the front portion of the skid 18 contacts the ground.

As shown in FIG. 2, when the aft portion of the skid strikes the ground, a nose-down moment is exerted on the helicopter by the vertical reaction load because the center of gravity of the helicopter is located forward of the aft portion of the skid 18. This nose-down moment causes a nose-down angular velocity as shown in FIG. 2. The same angular velocity causes the tail boom 16 to move upward as indicated by the arrow in FIG. 2.

The pilot's reaction to the nose-down velocity is to pull the cyclic control back. This brings the rotor blades down in the rear, while the tail boom is coming up, as shown in FIG. 3. If the motions are sufficiently strong, it is possible for the rotor 14 to strike the tail boom 16, resulting in substantial damage to the helicopter and injuries to the personnel. This problem motivated the development of the landing gear of the present invention, which solves the problem and provides additional benefits, as will be described below.

Figure 4:
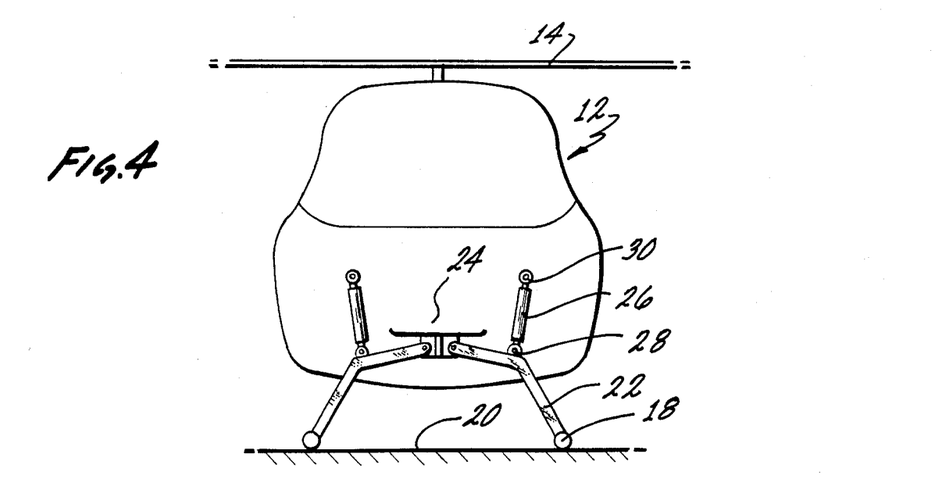
FIG. 4 is a front elevational view through the fuselage of the helicopter showing the structure of the landing gear.
Figures 5, 6, 7:
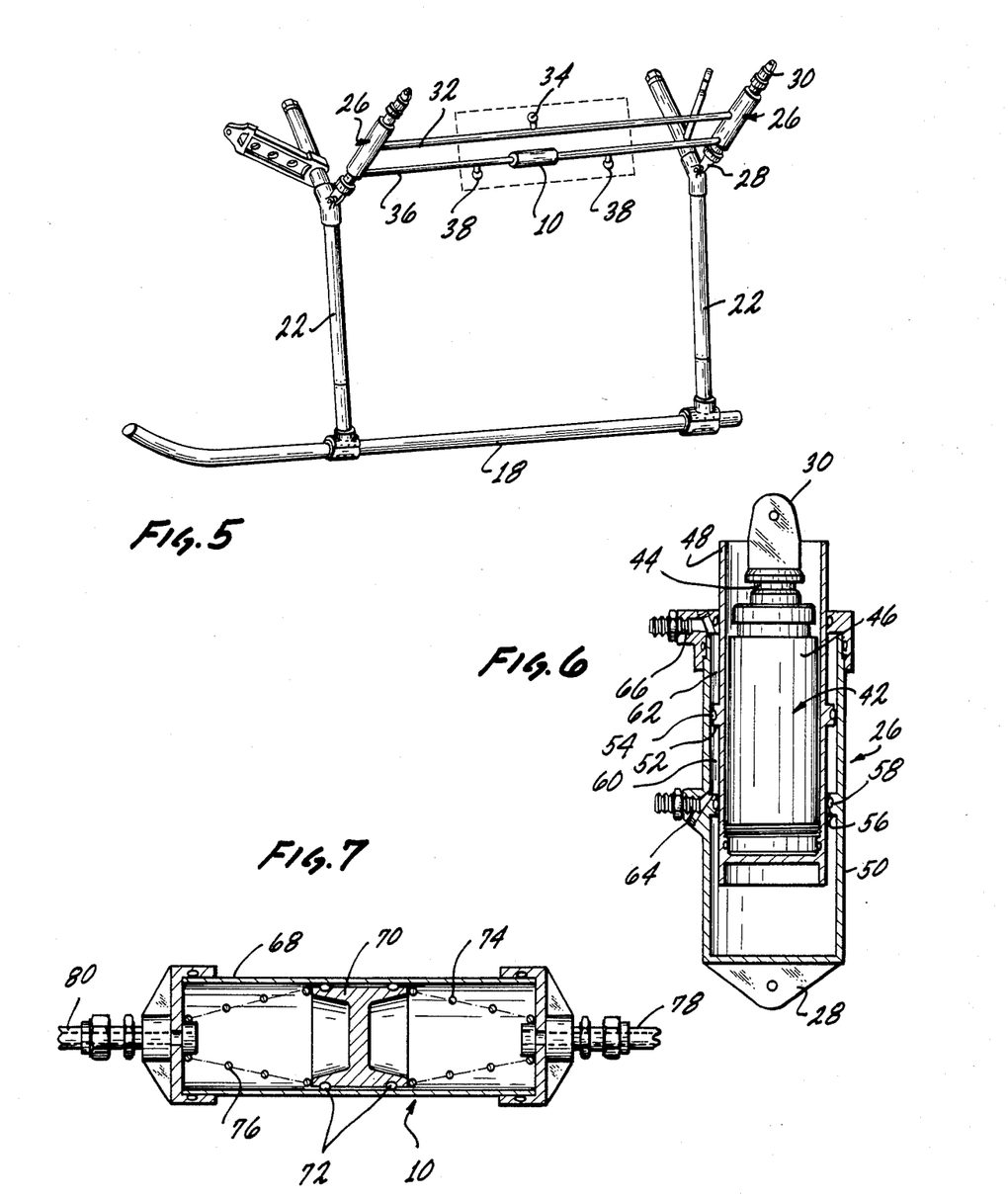
FIG. 5 is a perspective view of the left hand side of the landing gear in one embodiment of the present invention.
FIG. 6 is a cross-sectional view of a damper used in a preferred embodiment of the invention.
FIG. 7 is a cross-sectional view of the restoring device used in a preferred embodiment of the present invention.

FIGS. 4 and 5 illustrate the mechanical and structural aspects of the landing gear of the present invention. The skid 18 is connected to an upwardly extending cross tube 22 which is pivotally connected to the airframe structure 24. A damper 26 has a first end 28 pivotally connected to the cross tube 22, and has a second end 30 pivotally connected to the airframe structure 24.

From FIGS. 4 and 5 it can be seen that the skids 18 pivot outwardly as the weight of the helicopter 12 settles on the ground 20, and this compresses the damper 26. As indicated diagrammatically in FIG. 5, the dampers 26 are connected by a first line 32 which communicates with a reservoir 34, and are also connected by a second line 36 which includes the surge reservoirs 38 and the restoring device 10. The hydraulic components 32, 34, 36, 38, and 10 are mechanically isolated from the structure of the landing gear by low-constraint interconnections, such as flexible hoses. This permits the components 34, 38, and 10 to be affixed to the airframe structure 24.

The structure of the damper 26 is shown in greater detail in FIG. 6.

The damper 26 includes a shock absorber 42 of the type in which a piston 44 moves resistantly within a cylinder 46. A hollow intermediate cylinder 48 is affixed to the outside of the cylinder 46. The cylinder 46 may include a damping fluid, but that fluid is entirely separate from the hydraulic system of the invention.

The hollow intermediate cylinder 48 is surrounded by and spaced from an outer cylinder 50. The intermediate cylinder 48 includes a flange 52 having a seal 54 capable of maintaining a sealing engagement with the inner surface of the outer cylinder 50, while sliding axially with respect to it.

The outer cylinder 50 includes a flange 56 having a seal 58 for maintaining a sealing engagement with the outer surface of the intermediate cylinder 48 while sliding axially with respect to it.

Thus, there is defined a lower chamber 60 and an upper chamber 62 which are important parts of the hydraulic system of the present invention. A port 64 permits fluid to flow into and out of the lower chamber 60, and a port 66 permits fluid to flow into and out of the upper chamber 62.

As a compressive force is applied between the first end 28 and the second end 30 of the damper 26 of FIG. 6, as happens when the weight when the helicopter 12 settles onto the ground 20, the volume of the lower chamber 60 is reduced, while the volume of the upper chamber 62 is increased. If the volume of the lower chamber 60 were to be decreased to zero, so that the flanges 52, 56 are in contact, the shock absorber 42 would nonetheless be effective in damping motions of the first end 28 with respect to the second end 30. In the preferred embodiment, in practice, the volume of the chambers 60, 62 is never reduced to zero.

FIG. 7 shows the most important component of the hydraulic system of the present invention; it is the restoring device 10.

As shown in FIG. 7, the restoring device 10 includes a hollow cylinder 68 having opposite ends which are closed except for the ports 78, 80. A piston 70 is mounted within the hollow cyinder 68 for axial motion, and the seals 72 maintain a sealing engagement with the inside surface of the hollow cylinder 68 as the piston 70 moves. The piston 70 is poised between the springs 74, 76, which are compression springs in a preferred embodiment, but in other embodiments tension springs are used.

The piston 70 divides the space within the hollow cylinder 68 into two chambers which are normally filled with hydraulic fluid communicated to them through the ports 78, 80. When the hydraulic fluid on one side of the piston is pressurized, an hydraulic force is applied to the piston 70 tending to push the piston toward the opposite side. Such an hydraulic force is yieldingly resisted by at least one of the springs 74, 76 which continually yieldably urge the piston to an equilibrium position.

The operation of the restoring device 10 is as follows. When the aircraft is in flight and the landing gear is in its normal position with respect to the airframe, the hydraulic pressure on the right side of the piston 70 is equal to the hydraulic pressure on the left side of the piston 70. The net hydraulic force acting on the piston 70 is zero, and the piston 70 is poised at an equilibrium position by the springs 74, 76.

As discussed above, when the helicopter or aircraft makes a nose-up landing, the aft part of the skid strikes the ground first. As will be seen below, this has the effect of applying pressure to the hydraulic fluid on the right side of the piston 70. The resulting unbalanced hyraulic force drives the piston 70 to the left, forcing hydraulic fluid out through the port 80. This expressed hydraulic fluid is used to extend the forward part of the skid, which normally contacts the ground shortly thereafter thereby increasing the pressure in the left chamber, while decreasing the pressure in the right chamber of the hollow cylinder 68. The net hydraulic force acting on the piston 70 is thereby reduced, and may become small, relative to the restoring force of the springs 74, 76 which then return the piston 70 to its equilibrium position.

In the event the helicopter takes off immediately after the initial contact of the aft part of the skid with the ground, but before the forward part of the skid has contacted the ground, the piston 70, having been forced to the left by the initial contact, will thereafter be returned to the equilibrium position by the springs 74, 76, after the hydraulic pressure in the right hand chamber has been relieved, i.e., after the helicopter has become airborne.

In a preferred embodiment, used on the Hughes Helicopters' Model OH-6A helicopter, the restoring device 10 has a spring constant of 103 pounds per inch and has a damping constant of 10.3 pounds per inch per second.

The present invention is not limited to the use of a skid-type landing gear. Skis or pontoons may alternatively be used. Also, the skid may be replaced by wheels 92 attached to the ends of the cross tubes 22 (compare FIG. 9 and 18); in this sense the cross tubes 22 will be referred to as landing gears.

Figure 8:
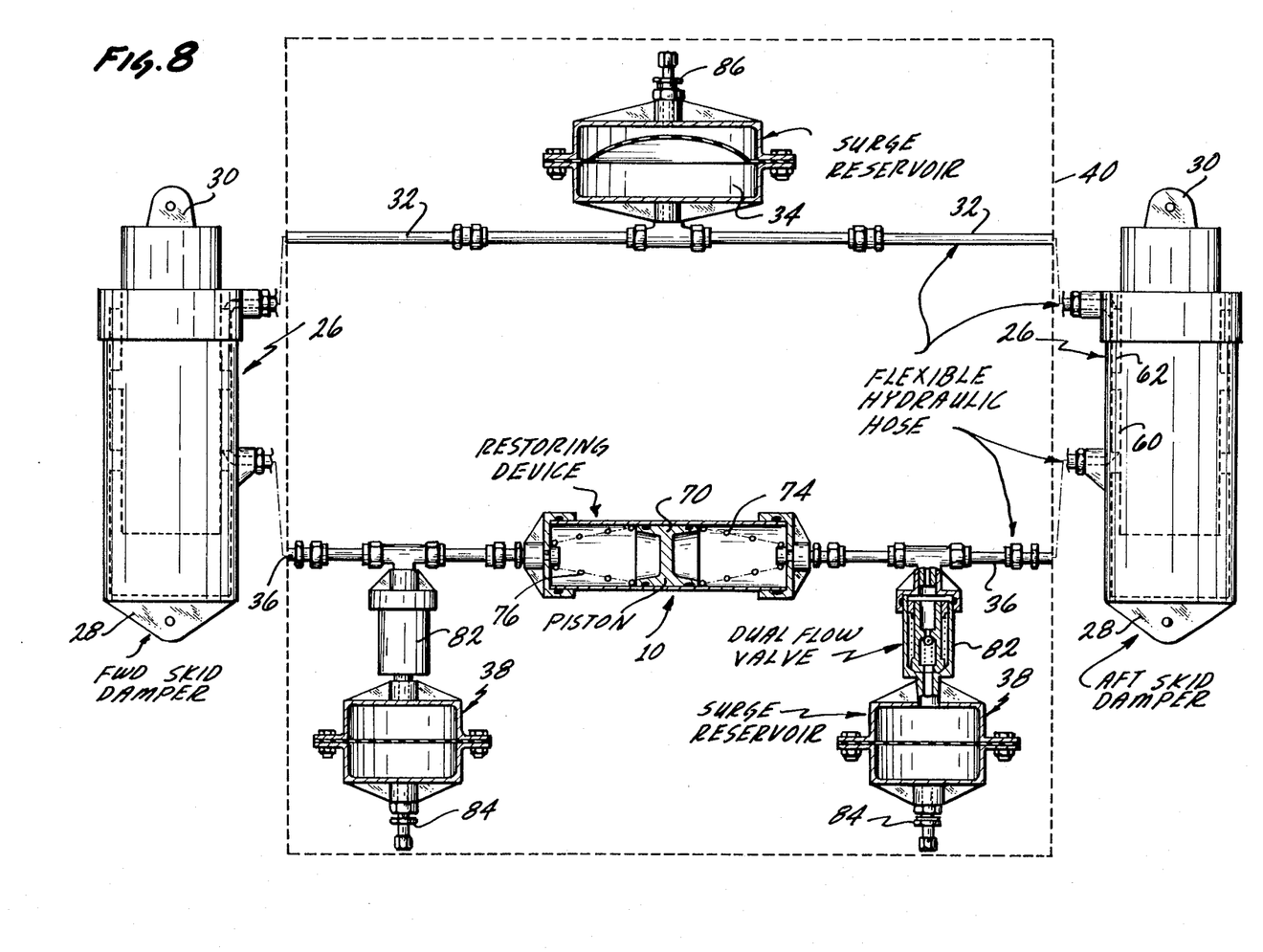
FIG. 8 is a schematic diagram showing the hydraulic system used in one embodiment of the present invention.

FIG. 8 is an hydraulic diagram showing in greater detail the hydraulic interconnection of FIG. 5. It will be appreciated that FIGS. 5 and 8 are simplified embodiments of the present invention in which only a forward and an aft cross tube are interconnected, and in which only one skid 18 is shown for simplicity.

As can thus be seen in FIG. 8, when the aft end of the skid 18 strikes the ground in a nose-up landing, the first end 28 of the aft damper 26 is pushed upwards with respect to the second end 30 which is attached to the airframe. This compresses the lower chamber 60 of the aft damper 26, pressurizing the hydraulic fluid in the lower chamber 60 and forcing that fluid through the aft line 36 and into the port 78 of the restoring device 10. This forces the piston 70 to the left as viewed in FIG. 8, thereby forcing hydraulic fluid through the forward line 36 and into the lower chamber 60 of the forward damper 26, causing the forward damper to extend, thereby lowering the forward part of the skid.

Concurrently with the expression of damping fluid from the lower chamber 60 of the aft damper, and concurrently with the decrease of volume of the upper chamber 62 of the forward damper, hydraulic fluid flows from the upper chamber 62 of the forward damper through the line 32 and into the upper chamber 62 of the aft damper. This prevents cavitation.

The hydraulic drag of the fluid as it flows through the restoring device 10, as well as the friction in the other parts of the system, absorbs the energy of the impact of the aft portion of the skid against the ground. The lowering of the forward end of the skid tends to limit the nose-down pitching shown in FIG. 2 by causing the forward portion of the skid to contact the ground sooner. When the forward portion of the skid 18 strikes the ground, the lower end 28 of the forward damper is pushed upwards, thereby diminishing the volume of the lower chamber 60 of the forward damper, and increasing the hydraulic pressure on the left side of the piston 70 of the restoring device 10. The piston 70 then moves to the right, thereby extending the aft skid damper 26. Thereafter, the piston 70 moves to an equilibrium position at which the hydraulic forces and the forces applied by the springs 74, 65 total to zero.

Assume, for purposes of illustration, that when the helicopter is parked on the ground, the pressure in the forward lower chamber 60 and the aft lower chamber 60 are equal, and that the piston 70 is at an equilibrium position. If a downward impulse were applied to the tail of the helicopter, the piston 70 of the restoring device 10 would undergo a damped oscillation about the equilibrium position, and the airframe of the helicopter would oscillate with a damped oscillation similar to that observed when one end of an automobile is pushed downwardly and then released.

In the event the helicopter makes a level but forceful landing, the pressures in the forward and aft lower chambers 60 will remain substantially equal but will increase to a very high value. This would necessitate the use of hydraulic lines 32, 36 capable of withstanding extremely high pressures. Consequently, the lines would be stiff and would therefore interfere with the movement of the ports 64, 66 of the dampers 26 with respect to the airframe 40. Also, the use of high-pressure tubing would add to the overall weight of the system. To avoid the necessity for using high-pressure tubing, the system shown in FIG. 8 is provided with surge reservoirs 38 in the forward and aft lines 36. The reservoirs are connected to the lines by dual-flow valves 82. The valves 82 serve as relief valves to limit the line pressures by acting to permit fluid to flow from the line 36 into the surge reservoir 38 when the pressure in the line 36 exceeds that in the surge reservoir 38 by a preselected amount. In a preferred embodiment, this preselected amount is 1200 psi.

The pressure reservoirs 38 include high-pressure air charging valves 84 which permit the reservoir to be pressurized. This permits the reservoir 38 to supply pressurized fluid to the valve 82, which is transmitted back into the line 36 when, at some later time, the pressure in the line 36 has subsided. The valve 82 is equivalent to a parallel combination of preloaded check valves oriented in opposite directions.

The reservoir 34 in the line 32 is also pressurized through the high-pressure air charging valve 86 to maintain substantial equality of the pressures in the upper and lower chambers 62, 60. The reservoir 34 supplies hydraulic fluid to the system to make up for leakage.

From the system shown in FIG. 8 it can be seen that if, after the aft end of the skid 18 has struck the ground, the pilot aborts the landing attempt and takes off, the piston 70 which was driven to the left by the initial impact, will thereafter be restored to its equilibrium position through the action of the springs 74, 76, thereby restoring the skid to its normal in-flight attitude with respect to the airframe without the necessity of intervention by the pilot.

Alternatively, following a nose-up landing in which the aft damper 26 is compressed and the forward damper 26 is extended, the springs 74, 76 of the restoring device 10 will restore the attitude of the airframe to its normal attitude with respect to the ground.

Because the damper 26 of FIG. 6 incorporates the shock absorber 42, the system of FIG. 8 behaves dynamically as if the shock absorber 42 were connected in series with a second shock absorber also including a spring and dashpot. These latter items are derived substantially from the spring constant and the damping coefficient of the restoring device 10. These parameters are then additional design variables which may be chosen deliberately to minimize shaking of the helicopter caused by unbalance of the main rotor when the aircraft is parked on the ground. For example, it is quite clear that the natural frequency of the parked aircraft must be well separated in frequency from the rotor frequency to avoid ground resonance. It has been found that through suitable choice of the stiffness and damping coefficient of the restoring device, the natural frequency of the landing gear system can be reduced by at least a factor of 2 and the damping margin can be increased by at least a factor of 10.

It is to be observed that the landing impact energy is absorbed by the system of the present invention instead of being converted to nose-down angular velocity of the airframe. This reduction in the nose-down angular velocity reduces the inclination of the pilot to pull back on the cyclic control, and thereby greatly reduces the possibility of rotor-tail boom strikes.

Alternatively stated, the system of the present invention redistributes the impact energy and reduces the nose-down pitching moment by providing an interconnection between the front and rear landing gears. Through this interconnection, as the rear landing gear moves from the flight static position toward the full-in position under landing impact, the front gear is impelled to move from the flight static position to the full-out position. When these motions have been accomplished, the skids (or front and rear wheels) are on the ground surface and the vertical reactions inherent in absorbing the autorotational landing do not produce a nose-down pitching moment.

The ability of the system shown in FIG. 8 to distribute the energy of a nose-up landing and to restore the airframe to a desired equilibrium attitude with respect to the ground, as described above, suggests that a comparable system would be effective if connected between the left and right landing gears to absorb the energy of a landing with one side low and to provide for lateral righting of the airframe following the landing. This suggestion has already been followed up and is embodied in the system shown in FIG. 9.

Figure 9:
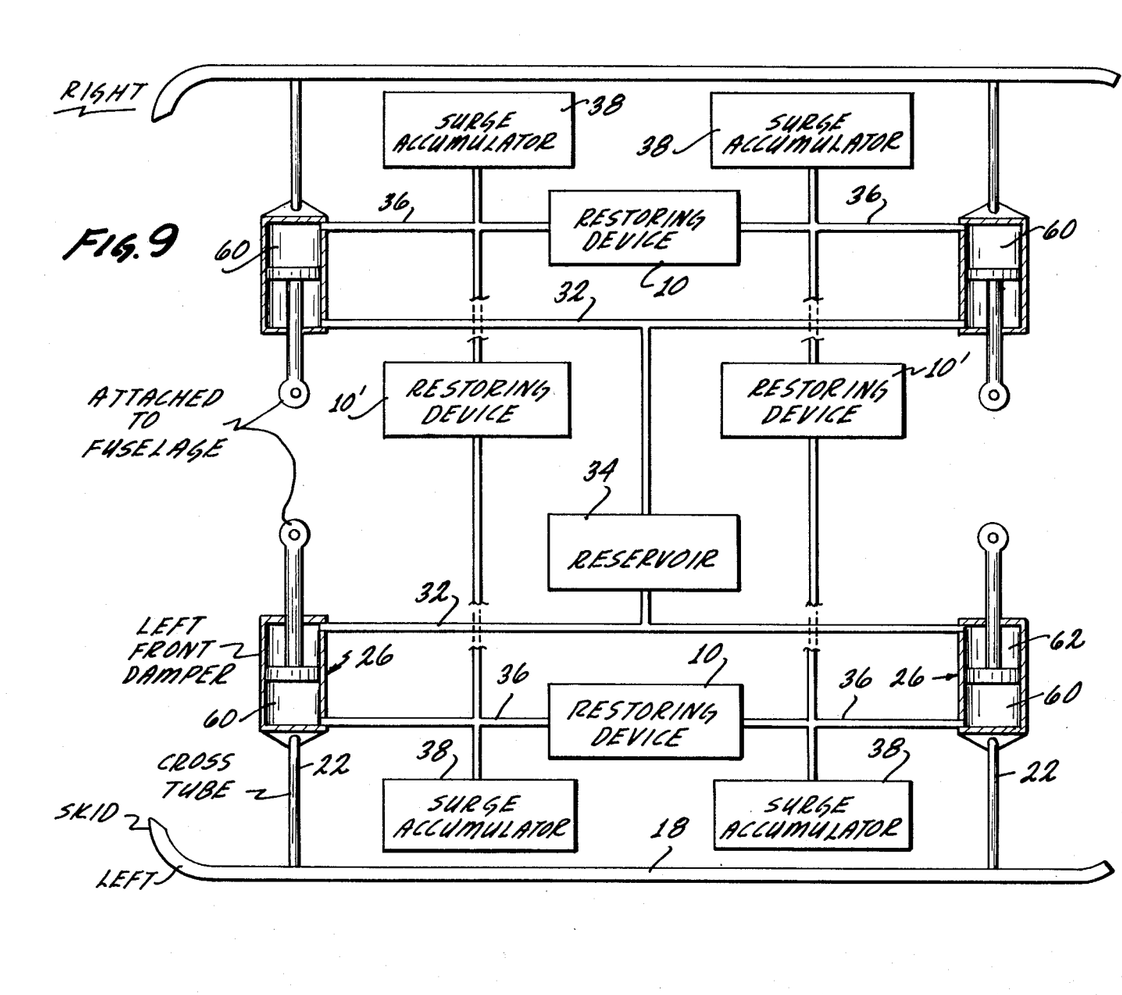
FIG. 9 is a schematic hydraulic diagram showing the hydraulic system used in a preferred embodiment of the present invention.

FIG. 9 shows a preferred embodiment of the present invention in which the dampers 26 are interconnected hydraulically in the lateral direction as well as in the forward and aft direction. A perusal of FIG. 9 reveals that it consists largely of two systems of the type shown in FIG. 8—one on each side of the airframe. Additionally, the system includes a restoring device 10' connected between the forward lines 36 and a second restoring device 10' connected between the aft lines 36 on opposite sides of the airframe. A common reservoir 34 is connected to the left and right lines 32, and serves the same purpose as the reservoir 34 of FIG. 8.

The operation of the system shown in FIG. 9 is as follows. If only one of the chambers is compressed, the remaining chambers 60 will be expanded, thereby extending the cross tubes 22 that are attached to them. If two or three of the chambers 60 are compressed, the remaining chambers 60 will be expanded, regardless of their location. This is the result that is desired, because extension of the landing gears that have not yet contacted the ground minimizes the extent of the undesired angular velocities that are generated as the landing energy is converted to angular motion of the airframe as it pivots about the landing gears which have already contacted the ground.

If all parts of both skids strike the ground at the same time, as in a level landing, the landing energy is absorbed by the flow of hydraulic fluid from all four chambers 60 into the four surge accumulators 38.

The restoring devices 10' return the right and left portions of the landing gear system to their desired equilibrium position, while the restoring devices 10 accomplish the same result in the forward-aft direction, as discussed in connection with FIG. 8. Further, lateral interconnection greatly reduces ground resonance.

Figure 18:
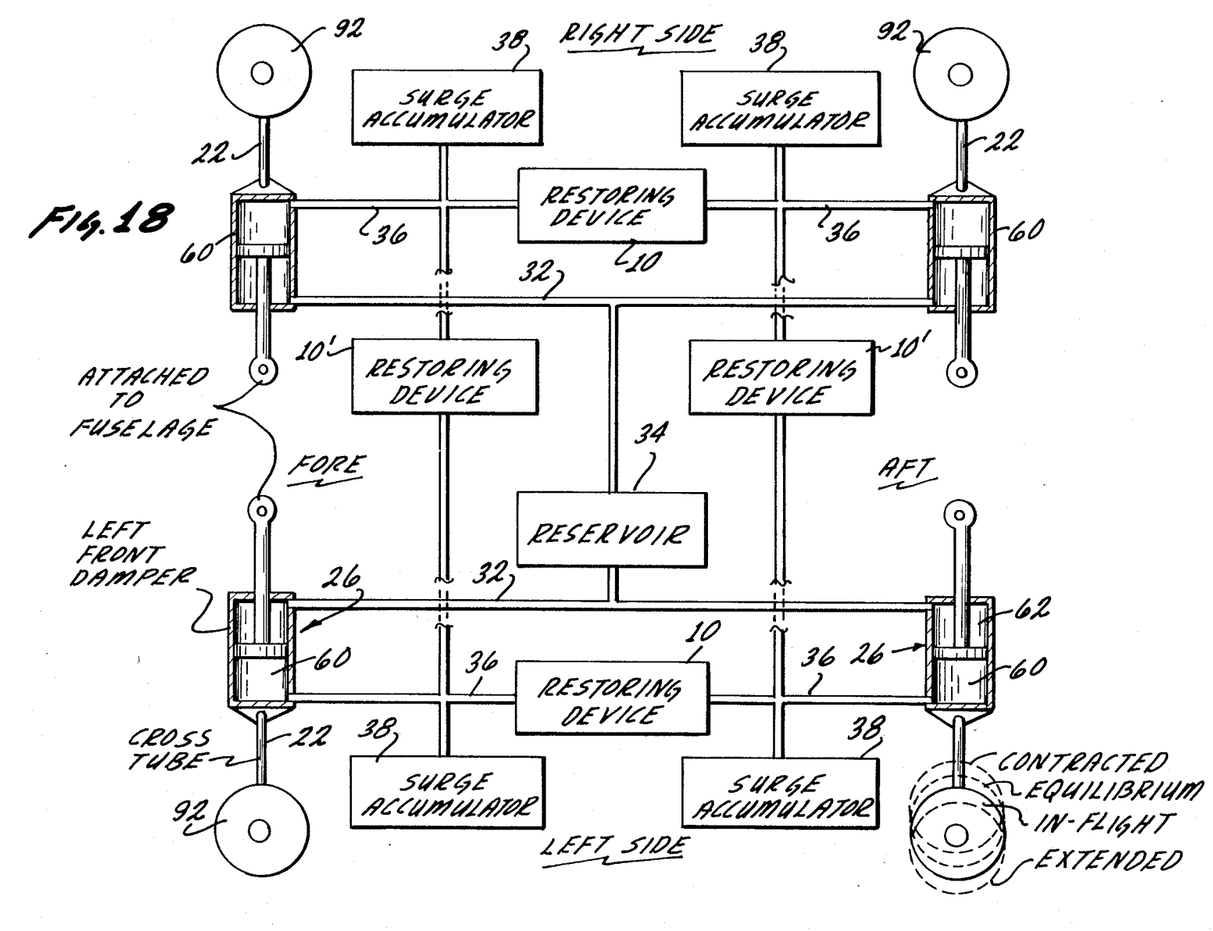

FIG. 18 shows an alternative embodiment similar to FIG. 9, but in which wheels 92 have been substituted for the skids. The system shown in FIG. 18 is deemed to include four landing gears, each including a damper 26, a cross tube 22, and a wheel 92.

Figure 10:
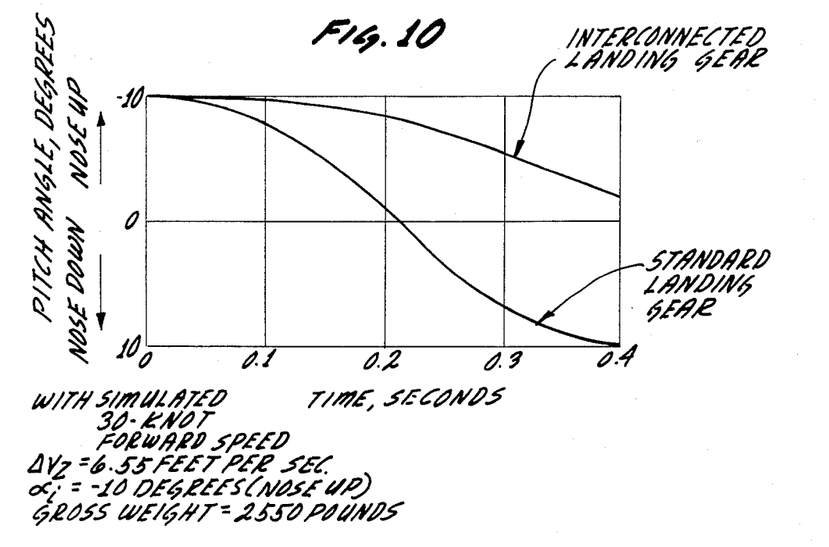
FIG. 10 is a graph of pitch angle versus time for an autorotation landing with a 30-knot forward speed.
Figure 11:
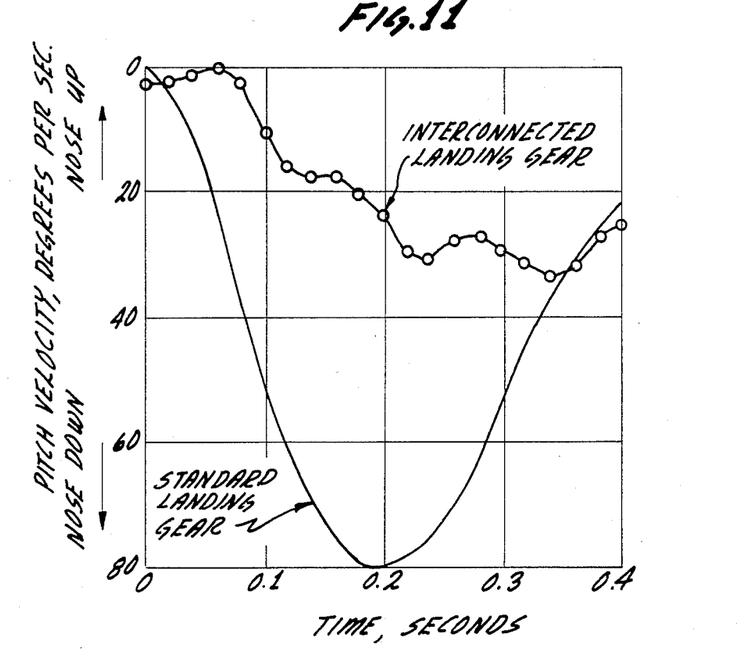
FIG. 11 is a graph of pitch angular velocity versus time for an autorotation landing with a 30-knot forward speed.
Figure 12:
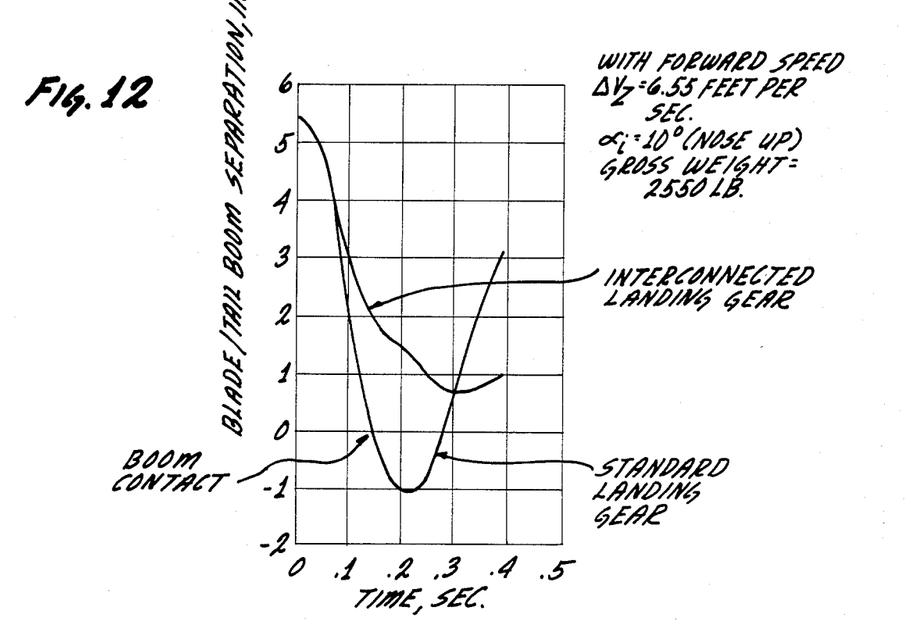
FIG. 12 is a graph of the separation between the rotor and the tail boom versus time for an autorotation landing with a 30-knot forward speed.

The graphs of FIGS. 10, 11, and 12 demonstrate the usefulness and functionality of the system of the present invention. FIGS. 10 and 11 are based on laboratory test results which simulated a nose-up autorotation landing with forward speed. The descent rate was 6.55 feet per second, the initial pitch angle was $-10°$ (nose-up), and a 30-knot forward speed was simulated. The aircraft simulated was the OH-6A helicopter, loaded to a gross weight of 2550 pounds.

FIG. 10 shows that the interconnected landing gear of the present invention greatly reduces the tendency of the helicopter to nose down following a nose-up landing. FIG. 11 demonstrates that the present invention greatly reduces the nose-down angular velocity, which also equals the angular velocity with which the tail boom is moving upward. FIG. 12 shows that even under the assumed severe landing conditions, the clearance between the rotor and the tail boom is increased by a sufficient margin to prevent the rotor from striking the tail boom.

Figure 13:
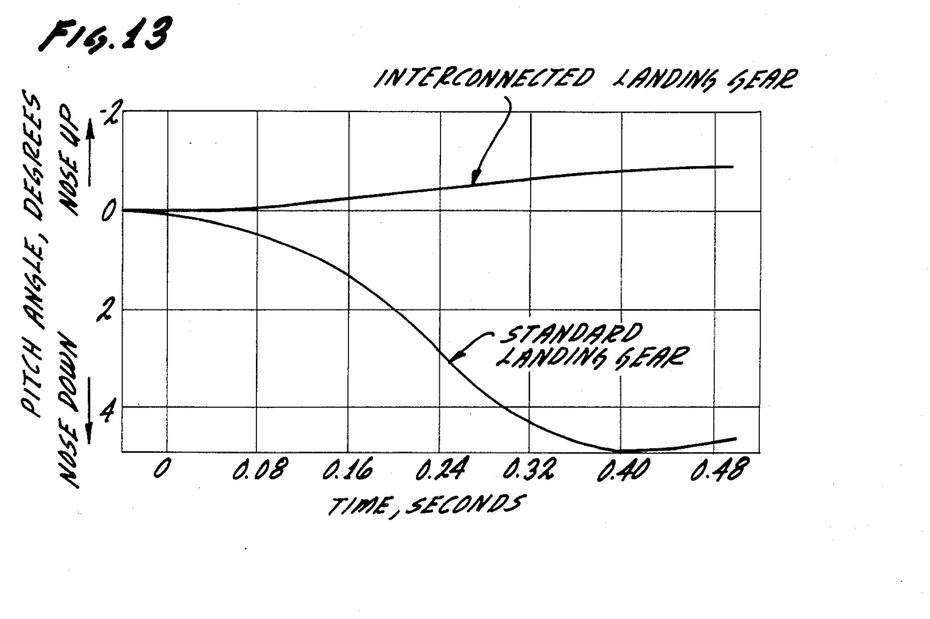
FIG. 13 is a graph of pitch angle versus time for an autorotation landing with no forward speed.
Figure 14:
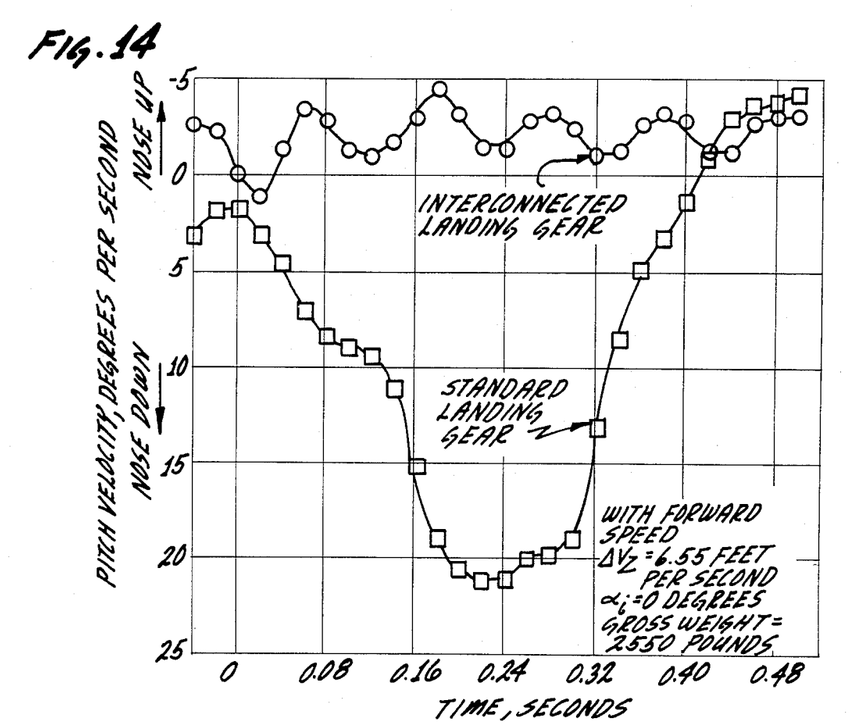
FIG. 14 is a graph of pitch angular velocity versus time for an autorotation landing with no forward speed.
Figure 15:
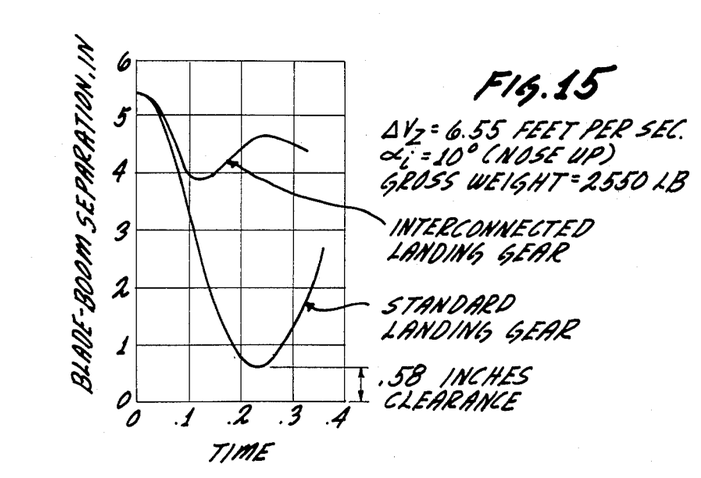
FIG. 15 is a graph of the separation between the rotor and the tail boom versus time for an autorotation landing with no forward speed.

FIGS. 13, 14, and 15 are comparable to FIGS. 10, 11, and 12, respectively, but the test conditions differ in that in FIGS. 13, 14 and 15 the forward velocity was zero and the initial pitch angle also was zero; therefore, FIGS. 13, 14, and 15 represent a level autorotational landing with zero forward speed. This condition is not as severe as the conditions used in FIGS. 10, 11, and 12 because the forward velocity greatly increases the nose-down angular velocity. Accordingly, the improvement brought about by the present invention appears even more dramatically in FIGS. 12, 14, and 15.

Figure 16:
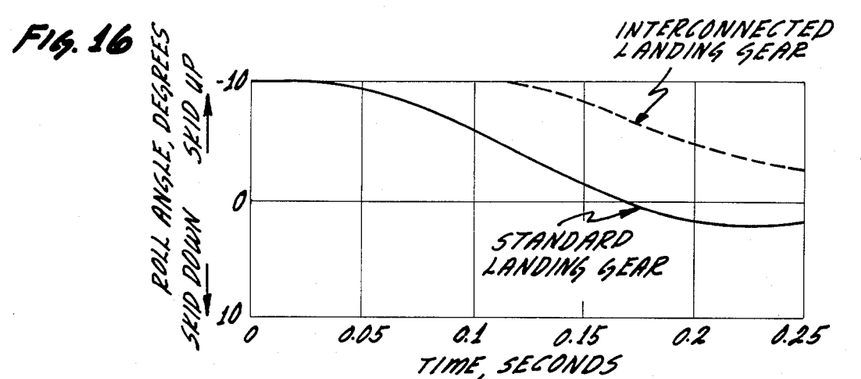
FIG. 16 is a graph of roll angle versus time for an autorotation landing with one side of the helicopter lower than the other side.
Figure 17:
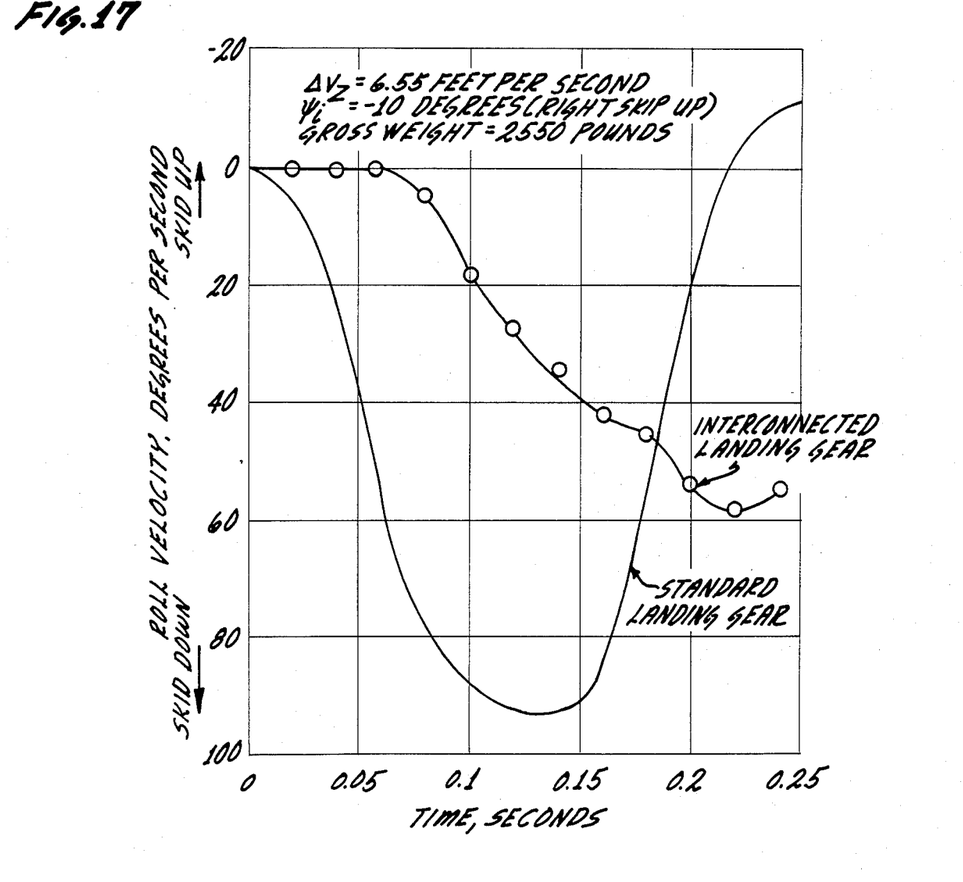
FIG. 17 is a graph of roll angular velocity versus time for an autorotation landing with one side of the helicopter lower than the other side; and, FIG. 18 is a schematic hydraulic diagram showing the hydraulic system used in an alternative embodiment of the present invention.

FIGS. 16 and 17 are comparable to FIGS. 13 and 14 and show the ability of the system of the present invention as shown in FIG. 9 to reduce the roll angle and roll velocity when the helicopter has an initial roll angle at the instant of impact with the ground. Again, in FIGS. 16 and 17, the efficacy of the system of the present invention is clearly demonstrated.

Thus, there has been described an interconnected hydraulic landing gear system for use on an aircraft. The system performs four major functions. First, the system absorbs and distributes the energy of the landing. Second, when one of the landing gears strikes the ground before the others, the other landing gears are extended so as to reduce the extent of rolling and pitching motions which occur as the settling aircraft pivots about the landing gear which has already made contact with the ground. Third, if one of the landing gears has struck the ground and has become compressed while the other landing gears have been extended, and if the landing is then aborted, the system thereafter restores all the landing gears to their normal equilibrium in-flight positions with respect to the airframe. Fourth, after all of the landing gears are on the ground following a non-level landing, the system of the present invention thereafter restores the attitude of the aircraft to its normal equilibrium attitude with respect to the ground.

The foregoing detailed description is illustrative of one embodiment of the invention, and it is to be understood that additional embodiments thereof will be obvious to those skilled in the art. The embodiments described herein, together with those additional embodiments, are considered to be within the scope of the invention.

What is claimed is:

1. A landing apparatus for use in an aircraft to reduce angular motions of the aircraft in a non-level landing and to restore the aircraft to an equilibrium attitude with respect to the ground following such a landing, comprising:
   an aft landing strut coupled to said aircraft;
   a forward landing strut couple to said aircraft;
   an aft damper coupled to said aft landing strut;
   a forward damper coupled to said forward landing strut;
   a restoring piston hydraulically coupled to said aft and forward dampers, compression of one of said forward and aft dampers forcing hydraulic fluid into said restoring piston and said restoring piston in response forcing hydraulic fluid into the other one of said aft and forward dampers, said restoring piston having a preferred configuration wherein hydraulic fluid is evenly distributed by said restoring device between said aft and forward dampers to restore said aircraft to said equilibrium attitude;
   an aft surge reservoir hydraulically coupled to said aft damper and to said restoring piston to limit the magnitude of the hydraulic pressure communicated therebetween; and
   a forward surge reservoir hydraulically coupled to said forward damper and to said restoring piston to limit the magnitude of pressure of said hydraulic fluid communicated therebetween.

2. The landing apparatus of claim 1 wherein said aft and forward dampers are further hydraulically communicated to provide make-up hydraulic fluid to each other, hydraulic fluid being forced from one of said aft dampers and forward dampers and flowing to said restoring piston and thence to said other one of said aft and forward dampers, thereby forcing make-up hydraulic fluid from said other one of said aft and forward dampers to said one of said aft and forward dampers to replace hydraulic fluid forced therefrom.

3. The landing apparatus of claim 2 further comprising a make-up surge reservoir and wherein said make-up hydraulic fluid communicated between said aft and said forward dampers is communicated through said make-up surge reservoir to limit the magnitude of pressure of said make-up hydraulic fluid.

4. Landing apparatus for use on an aircraft to reduce angular motions of the aircraft in a non-level landing and to restore the aircraft to an equilibrium attitude with respect to the ground following such a landing, comprising:
   first landing gear means having an equilibrium position and mounted to the aircraft for upward and downward motions from the equilibrium position;
   a first chamber so connected to said first landing gear means that the volume of said chamber is altered in relation to the upward and downward motions of said first landing gear means, said first chamber filled with a fluid;
   second landing gear means having an equilibrium position and mounted to the aircraft for upward and downward motions from the equilibrium position;
   a second chamber so connected to said landing gear means that the volume of said chamber is altered in relation to the upward and downward motions of said second landing gear means, said second chamber filled with a fluid;
   interconnection means providing a closed passage for fluid communication between said first chamber and said second chamber so that upward and downward motions of said first landing gear means produce downward and upward motions respectively of said second landing gear means;
   said interconnection means further including a restoring device located in said closed passage and interacting with the fluid therein to yieldably bias said first landing gear means and said second landing gear means to their respective equilibrium positions,
   wherein said interconnection means further comprise surge accummulator means communicating with said passage for absorbing some of the energy of a substantially level landing in which said first landing gear means and said second landing gear means remain substantially in their equilibrium positions.

5. The landing apparatus of claim 4 wherein said restoring device impedes the flow of fluid through said passage so as to damp the upward and downward motions of said first landing gear means and of said second landing gear means.

6. The landing apparatus of claim 4 wherein said first landing gear means are mounted on one side of the aircraft and said second landing gear means are mounted on the other side of the aircraft.

7. The landing apparatus of claim 4 wherein said first landing gear means is mounted to the aircraft forward of said second landing gear means.

8. A landing apparatus for use on an aircraft comprising:
   first landing gear means having an equilibrium position and mounted to the aircraft for upward and downward motions from the equilibrium position, said first landing gear means including a damper coupled to said aircraft;
   second landing gear means having an equilibrium position and mounted to the aircraft for upward and downward motions from the equilibrium positions, said second landing gear means including a second damper coupled to said aircraft;
   interconnection means hydraulically interconnecting said first and second dampers so that upward and downward motions of said first landing gear means produces downward and upward motions respectively of said second landing gear means, said interconnection means further including restoring means hydraulically coupled to said first and second dampers, compression of one of said first and second dampers forcing hydraulic fluid into said restoring means, said restoring means in response thereto forcing hydraulic fluid into the other one of said first and second dampers; and a surge reservoir means hydraulically coupled to at least one of said first and second dampers and to said restoring means for limiting the magnitude of hydraulic pressure communicated therebetween.

9. Landing apparatus for use on an aircraft to reduce angular motions of the aircraft in a non-level landing and to restore the aircraft to an equilibrium attitude with respect to the ground following such a landing, comprising:

an aft starboard landing strut coupled to said aircraft;
a forward starboard landing strut coupled to said aircraft;
an aft port landing strut coupled to said aircraft;
a forward port landing strut coupled to said aircraft;
an aft starboard damper coupled to said aft starboard landing strut;
a forward starboard damper coupled to said forward starboard landing strut;
an aft port damper coupled to said aft port landing strut;
a forward port damper coupled to said forward port landing strut;
said aft and forward starboard damper and said aft and forward port damper comprised of a piston and a cylinder, said piston disposed in said cylinder and defining a first and second chamber within said cylinder, and a first and second port defined in said first and second chambers respectively, hydraulic fluid being communicated into and out of said first and second chambers through said first and second ports, respectively;
a starboard restoring means hydraulically communicated with said first ports of said aft and starboard dampers, said starboard restoring means for communicating hydraulic fluid between said aft and forward starboard dampers in response to said non-level landing and then for restoring the distribution of said hydraulic fluid between said aft and forward starboard dampers;
a starboard surge means hydraulically communicated to said starboard restoring means and to said first ports of said aft and starboard dampers for limiting the pressure of hydraulic fluid communicated among said starboard restoring means and aft and forward starboard dampers;
a port restoring means hydraulically communicated with said first ports of said aft and forward port dampers, said port restoring means for communicating hydraulic fluid between said aft and forward port dampers in response to said non-level landing and then for restoring the distribution of hydraulic fluid therebetween;
a port surge means hydraulically communicated to said port restoring means and to said first ports of said aft and forward port dampers for limiting the pressure of said hydraulic fluid communicated between said port restoring means and said aft and forward port dampers;
an aft restoring means hydraulically communicated to said first ports of said aft port and starboard dampers for communicating hydraulic fluid between said aft port and starboard dampers in response to said non-level landing, and then for restoring the distribution of hydraulic fluid therebetween;

said port and starboard surge means also for limiting the pressure of hydraulic fluid communicated between said aft port and starboard dampers;
a forward restoring means hydraulically communicated with said first ports of said forward port and starboard dampers for communicating hydraulic fluid therebetween in response to said non-level landing and then for restoring the distribution of hydraulic fluid therebetween;
said port and starboard surge means also for limiting the pressure of said hydraulic fluid communicated between said forward port and starboard dampers; and
a reservoir of hydraulic fluid coupled to each of said second ports of said aft port and starboard dampers and of said forward port and starboard dampers for providing make-up hydraulic fluid to said second chambers within each of said dampers.

10. A method for use on an aircraft to reduce angular motions of the aircraft in a non-level landing and to restore the aircraft to an equilibrium attitude with respect to ground following such a landing, comprising the steps of:

contacting said ground with a first landing strut;
compressing a first damper coupled to said first landing strut;
communicating said hydraulic fluid from said first damper to a restoring means;
communicating hydraulic fluid from said restoring means to a second damper;
expanding said second damper to extend a second landing strut coupled thereto;
contacting said ground with said second landing strut to reduce angular motion of said aircraft in said non-level landing; and
limiting the pressure of hydraulic fluid being communicated between said first and second dampers through said restoring means, said pressure being limited by surge means hydraulically communicating with said first and second dampers and said restoring means.

11. The method of claim 10 further comprising the steps of:

forcing hydraulic fluid from said restoring means back into said first damper after said non-level landing; and
simultaneously drawing hydraulic fluid from said second damper into said restoring means to redistribute hydraulic fluid between said first and second dampers to an original distribution of hydraulic fluid within said first and second dampers as obtained prior to said non-level landing and to thereby restore said aircraft to said equilibrium attitude with respect to said ground.

12. The method of claim 11 further comprising the steps of:

providing make-up hydraulic fluid between said first and second dampers through a make-up hydraulic line communicating said first and second dampers; and
limiting the pressure of said make-up hydraulic fluid being provided between said first and second dampers by communication of said make-up hydraulic line with a make-up surge reservoir means.

13. A method for use on an aircraft to reduce angular motions of the aircraft in a non-level landing to restore the aircraft to an equilibrium attitude with respect to ground following such landing, comprising the steps of:

contacting said ground with a first one of a plurality of landing struts;

compressing a corresponding one of a plurality of dampers coupled to said landing strut in contact with said ground;

communicating said hydraulic fluid from said one compressed damper to a corresponding one of a plurality of restoring means;

communicating hydraulic fluid from said one restoring means to a selected another one of said plurality of dampers, said selected damper having an opposing relationship with respect to said one compressed damper as determined by said attitude of said non-level landing;

expanding said selected damper with said hydraulic fluid communicated thereto to thus extend a corresponding one of said plurality of landing struts coupled to said selected damper;

contacting said ground with said corresponding one of said landing struts extended by expansion of said selected damper; and limiting the pressure of hydraulic fluid communicated between said one damper and said selected damper by a surge means hydraulically communicated between said one and selected dampers.

* * * * *